(12) United States Patent
Runde et al.

(10) Patent No.: US 8,336,525 B2
(45) Date of Patent: Dec. 25, 2012

(54) APPARATUS, SYSTEM, AND METHOD FOR ESTIMATING DETERIORATION OF A NOX SENSOR RESPONSE RATE

(75) Inventors: Jeff Runde, Fishers, IN (US); Xiao Lin, Indianapolis, IN (US); Daniel D. Wilhelm, Nashville, IN (US); David Everard, Columbus, IN (US); Carlos A. Lana, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 253 days.

(21) Appl. No.: 12/822,963

(22) Filed: Jun. 24, 2010

(65) Prior Publication Data

US 2011/0016849 A1 Jan. 27, 2011

Related U.S. Application Data

(60) Provisional application No. 61/220,053, filed on Jun. 24, 2009.

(51) Int. Cl.
*F02M 51/00* (2006.01)
(52) U.S. Cl. ............... 123/479; 123/688; 73/114.69; 60/274
(58) Field of Classification Search ............... 123/479, 123/691, 692, 688; 73/118.2, 23.31, 23.32, 73/114.69, 114.7, 114.73, 118.02; 60/274, 60/276, 277
See application file for complete search history.

(56) References Cited

U.S. PATENT DOCUMENTS

| | | | | |
|---|---|---|---|---|
| 6,085,518 A | * | 7/2000 | Yamashita et al. | 60/276 |
| 7,201,160 B2 | * | 4/2007 | Yoshiume et al. | 123/688 |
| 7,248,960 B2 | * | 7/2007 | Ikemoto et al. | 701/114 |
| 7,499,789 B2 | * | 3/2009 | Toda et al. | 701/109 |

FOREIGN PATENT DOCUMENTS

| | | |
|---|---|---|
| JP | 2008190383 A | 8/2008 |
| JP | 2008215260 A | 9/2008 |
| JP | 2009046992 A | 3/2009 |
| JP | 2009133238 A | 6/2009 |

OTHER PUBLICATIONS

PCT/US2010/039856, International Search Report and Written Opinion, Feb. 1, 2011.

* cited by examiner

*Primary Examiner* — John Kwon
(74) *Attorney, Agent, or Firm* — Kunzler Law Group, PC (57) ABSTRACT

An apparatus for determining a deterioration of a $NO_x$ sensor response rate in an internal combustion engine system includes an engine control module configured to stop fueling to an internal combustion engine during motoring of the internal combustion engine. The apparatus also includes a signal monitoring module configured to monitor a $NO_x$ sensor signal after the engine control module stops fueling to the internal combustion engine during motoring of the engine and store $NO_x$ sensor signal data corresponding to the monitored $NO_x$ sensor signal. Additionally, the apparatus includes a time constant module that is configured to determine a time constant of the $NO_x$ sensor response after the engine control module stops fueling. The apparatus further includes a response rate deterioration module configured to determine a response rate deterioration value of the $NO_x$ sensor based at least partially on the determined time constant.

23 Claims, 5 Drawing Sheets

APPARATUS, SYSTEM, AND METHOD FOR ESTIMATING DETERIORATION OF A NOX SENSOR RESPONSE RATE

CROSS-REFERENCE TO RELATED APPLICATION

This application claims the benefit of U.S. Provisional Patent Application No. 61/220,053, filed Jun. 24, 2009, which is incorporated herein by reference.

FIELD

This invention relates to exhaust systems for internal combustion engines, and more particularly to estimating a response rate deterioration of a $NO_x$ sensor configured to detect $NO_x$ in an exhaust gas stream.

BACKGROUND

Exhaust after-treatment systems receive and treat exhaust gas generated from an internal combustion engine. Typical exhaust after-treatment systems include any of various components configured to reduce the level of harmful exhaust emissions present in the exhaust gas. For example, some exhaust after-treatment systems for diesel powered internal combustion engines include various components, such as a diesel oxidation catalyst (DOC), particulate matter filter or diesel particulate filter (DPF), and selective catalytic reduction (SCR) catalyst. In some exhaust after-treatment systems, exhaust gas first passes through the diesel oxidation catalyst, then passes through the diesel particulate filter, and subsequently passes through the SCR catalyst.

Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst reduces the amount of nitrogen oxides ($NO_x$) present in the exhaust gas.

The operation of the engine and exhaust after-treatment components are based largely on the amount of $NO_x$ present in the exhaust gas stream at various stages within the exhaust after-treatment system. The amount of $NO_x$ in the exhaust stream typically is detected using one or more $NO_x$ sensors placed at least partially within the exhaust gas stream flowing through the exhaust after-treatment system. For example, some conventional exhaust after-treatment systems include a $NO_x$ sensor proximate an outlet of the engine exhaust manifold, an outlet of the SCR catalyst, and an outlet of the tailpipe. Each $NO_x$ sensor detects a $NO_x$ level in the exhaust gas stream and transmits a signal representing the detected $NO_x$ level to an electronic control module (ECM) or intermediate module. The ECM processes the detected $NO_x$ level received from the $NO_x$ sensor according to any of various computational methods to estimate the amount of $NO_x$ present in the exhaust gas stream at the particular location of the $NO_x$ sensor.

As the amount of $NO_x$ in the exhaust gas stream can affect many aspects of the engine system, the accuracy of the $NO_x$ level detected by the $NO_x$ sensors is important. Of particular importance is the accuracy of the signal from the tailpipe $NO_x$ sensor as it indicates the amount of $NO_x$ exiting the exhaust after-treatment system into the atmosphere. If the tailpipe $NO_x$ sensor is inaccurately detecting the level of $NO_x$ in the exhaust gas stream exiting the system, the system may be unnecessarily reducing too much $NO_x$ or unknowingly reducing too little $NO_x$. For example, if the $NO_x$ level detected by the tailpipe $NO_x$ sensor is erroneously high, then the system could be inefficiently reducing more $NO_x$ than is necessary. Alternatively, if the $NO_x$ level detected by the tailpipe $NO_x$ sensor is erroneously low, then the system may not be reducing enough $NO_x$ to meet emissions standards.

One source for inaccurate $NO_x$ level detection is the deterioration of the $NO_x$ sensor response rate over time. As a $NO_x$ sensor ages, the deterioration of the $NO_x$ sensor response rate increases and the accuracy of the $NO_x$ level detected by the $NO_x$ sensor decreases. Some conventional systems are equipped to estimate the level of deterioration of a $NO_x$ sensor response rate. These systems may use various techniques and methods for estimating the $NO_x$ sensor response rate deterioration level. However, these techniques and methods may suffer from certain drawbacks. For example, some systems do not distinguish between a slow change rate of a $NO_x$ sensor signal and a slow response due to $NO_x$ sensor deterioration. Additionally, some systems do not account for signal offset drift (e.g., noise) and transfer delays that may be characteristic of particular $NO_x$ sensor signals, such as signals from a tailpipe $NO_x$ sensor.

SUMMARY

The subject matter of the present application has been developed in response to the limitations of present state of the art concerning exhaust after-treatment control systems and on-board diagnostic systems. Accordingly, the subject matter of the present application has been developed to provide an apparatus, a system, and a method that overcomes at least some of the shortcomings of the present state of the art.

In one representative embodiment, an apparatus for determining a deterioration of a $NO_x$ sensor response rate in an internal combustion engine system includes an engine control module configured to stop fueling to an internal combustion engine during motoring of the internal combustion engine. The apparatus also includes a signal monitoring module configured to monitor a $NO_x$ sensor signal after the engine control module stops fueling to the internal combustion engine during motoring of the engine and store $NO_x$ sensor signal data corresponding to the monitored $NO_x$ sensor signal. Additionally, the apparatus includes a time constant module that is configured to determine a time constant of the $NO_x$ sensor response after the engine control module stops fueling. The apparatus further includes a response rate deterioration module configured to determine a response rate deterioration value of the $NO_x$ sensor based at least partially on the determined time constant.

In some implementations, the time constant of the $NO_x$ sensor response is determined using function fitting method, which can be a least squares fit method in certain instances. The curve fit of the least squares fit method can be defined by the values k and $k_2$ that provide the smallest value of $\Pi$ according to the equation $$\Pi = \sum_{i=1}^{n} [y_i - k_2 + ky_{i-1} - y_{i-1}]^2 = \min,$$

where $y_i$ is the $NO_x$ concentration in exhaust gas generated by the internal combustion engine at an ith sampling time, k is a function of the time constant of the $NO_x$ sensor signal and the sampling period, and $k_2$ is a function of k and an offset drift of the $NO_x$ sensor signal. In certain implementations, the time constant of the $NO_x$ sensor signal response is based on a discrete-time approximation of a continuous mathematical function.

In other implementations, the response rate deterioration module is configured to determine an offset drift of the $NO_x$ sensor signal. The time constant can be based at least partially on the offset drift.

In certain implementations, the response rate deterioration module is configured to determine a transfer delay of the $NO_x$ sensor signal. The transfer delay of the $NO_x$ sensor signal can be based at least partially on an estimated starting time of a decay of the $NO_x$ sensor signal response. In some implementations, the estimated starting time of the decay of the $NO_x$ sensor signal response is based on a comparison between an estimated $NO_x$ value at a time after the engine control module stops fueling and a sensed $NO_x$ value at the same time. In specific implementations, the estimated starting time of the decay of the $NO_x$ sensor signal is equal to the time at which a difference between the estimated $NO_x$ value and the sensed $NO_x$ value is above a threshold. In other implementations, the estimated $NO_x$ value can be estimated using a curve fit of the stored $NO_x$ sensor signal data during a testing time window after the engine control module stops fueling to the internal combustion engine during motoring of the internal combustion engine. In such implementations, the estimated $NO_x$ value can be estimated at a time prior to a start of the testing time window.

According to another embodiment, a system for determining a sensor condition includes a sensor that is configured to detect a property value and generate a response signal representative of the detected property value. The system also includes a controller communicable in response signal receiving communication with the sensor. The controller is configured to monitor the decay rate of a response signal received from the sensor and determine a deterioration factor corresponding with the response signal. In certain implementations, the controller models the sensor response as a first order linear dynamical system where the decay rate is the negative inverse of the system time constant. The controller can be configured to determine the decay rate by estimating the system time constant from the sensor signal using, for example, a least squares fit method. The deterioration factor can be based at least partially on the estimated system time constant.

According to certain implementations of the system, the system further includes an internal combustion engine capable of generating an exhaust gas stream. In such implementations, the sensor is configured to detect a property value of the exhaust gas stream. Generally, the internal combustion engine is in fueling receiving communication with a fuel source. The time constant can be a time constant of the response signal during a prescheduled testing period. The prescheduled testing period can be defined as a time period during which fueling of the internal combustion engine is stopped while motoring of the internal combustion engine is maintained.

In some implementations, the system also includes an on-board diagnostics indicator communicable in signal receiving communication with the controller. The controller signals the on-board diagnostics indicator to indicate a condition of the sensor in response to an estimated deterioration factor being above a threshold. The system may also include an internal combustion engine and a $NO_x$ sensor configured to detect an amount of $NO_x$ in an exhaust gas stream generated by the engine. The controller can be configured to stop fueling of the engine and monitor a decay rate of the response signal while fueling of the engine is stopped.

In another embodiment, a method for determining a deterioration of a $NO_x$ sensor response rate includes stopping fuel consumption in an internal combustion engine during motoring of the engine and monitoring a $NO_x$ sensor signal after fuel consumption has been stopped. The method also includes estimating a decay rate of the $NO_x$ sensor signal using a function fitting method, such as least squares fit. As defined herein, a function fitting method can be used interchangeably with a curve fitting method. Additionally, the method includes estimating a deterioration value of a response rate of the $NO_x$ sensor signal based at least partially on the estimated decay rate.

In certain implementations, the method includes estimating a transfer delay of the $NO_x$ sensor signal by estimating a starting time of a decay of the $NO_x$ sensor signal after fuel consumption has been stopped based on stored $NO_x$ sensor signal data collected during a predetermined time period following fuel consumption stoppage. The decay rate of the $NO_x$ sensor signal can be estimated based on the estimated starting time of the decay of the $NO_x$ sensor signal. A length of the predetermined time period can be based on at least one of a length of an exhaust after-treatment system to which the $NO_x$ sensor signal is coupled, a flow rate of exhaust gas through the exhaust after-treatment system, a diameter of an exhaust pipe of the exhaust after-treatment system, and a response time of the $NO_x$ sensor in a non-deteriorated condition.

Estimating the starting time of the $NO_x$ sensor signal decay can include using a first set of data of the stored $NO_x$ sensor signal data associated with a first time window to curve fit a first exponential function or non-exponential function having characteristics similar to an exponential function. The method can additionally include using the curve fit of the first exponential function to estimate a $NO_x$ value at a first time before the first time window and comparing the estimated $NO_x$ value at the first time with an actual $NO_x$ value at the first time. If the difference between the estimated $NO_x$ value and the actual $NO_x$ value is above a threshold, the method includes setting the first time as the starting time of the $NO_x$ sensor signal decay.

However, if the difference between the estimated $NO_x$ value and the actual $NO_x$ value is below a threshold, the method includes using a second set of data of the stored $NO_x$ sensor signal data associated with a second time window starting before the first time window to curve fit a second exponential function. Also, if the above conditions are met, the method includes using the curve fit of the second exponential function to estimate a $NO_x$ value at a second time before the second time window and the first time, comparing the estimated $NO_x$ value at the second time with an actual $NO_x$ value at the second time, and setting the second time as the starting time of the $NO_x$ sensor signal decay if the difference between the estimated $NO_x$ value at the second time and the actual $NO_x$ value at the second time is above the threshold.

In certain implementations of the method, the decay rate of the $NO_x$ sensor signal is estimated based on the estimated starting time of the decay of the $NO_x$ sensor signal. A length of the predetermined time period can be based on at least one of a length of an exhaust after-treatment system to which the $NO_x$ sensor signal is coupled, a flow rate of exhaust gas through the exhaust after-treatment system, a diameter of an exhaust pipe of the exhaust after-treatment system, and a response time of the $NO_x$ sensor in a non-deteriorated condition.

According to some implementations of the method, estimating the starting time of the decay of the $NO_x$ sensor signal includes analyzing stored $NO_x$ sensor signal data after a predicted starting time of the $NO_x$ sensor signal decay and incrementally backtracking to analyze earlier stored $NO_x$ sensor signal data.

Reference throughout this specification to features, advantages, or similar language does not imply that all of the features and advantages that may be realized with the subject matter of the present application should be or are in any single embodiment or implementation of the subject matter. Rather, language referring to the features and advantages is understood to mean that a specific feature, advantage, or characteristic described in connection with an embodiment is included in at least one embodiment of the subject matter of the present application. Discussion of the features and advantages, and similar language, throughout this specification may, but do not necessarily, refer to the same embodiment or implementation.

The described features, advantages, and characteristics of the subject matter of the present application may be combined in any suitable manner in one or more embodiments and/or implementations. One skilled in the relevant art will recognize that the present subject matter may be practiced without one or more of the specific features or advantages of a particular embodiment or implementation. In other instances, additional features and advantages may be recognized in certain embodiments and/or implementations that may not be present in all embodiments or implementations. These features and advantages of the subject matter of the present application will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present invention, however, absent an express correlation to indicate otherwise, an implementation may be associated with one or more embodiments.

In the following description, numerous specific details are provided to impart a thorough understanding of embodiments of the subject matter of the present application. One skilled in the relevant art will recognize, however, that the subject matter of the present application may be practiced without one or more of the specific details, or with other methods, components, materials, and so forth. In other instances, well-known structures, materials, or operations are not shown or described in detail to avoid obscuring aspects of the subject matter of the present application.

Described herein are various embodiments of an apparatus, a system, and a method for accurately estimating the deterioration of a $NO_x$ sensor response rate. Generally, in some embodiments, the $NO_x$ sensor response rate deterioration is estimated based on a $NO_x$ sensor response during a vehicle motoring condition using a function fitting method, such as, but not limited to, least squares. In some implementations, the $NO_x$ sensor response rate deterioration estimate takes into account possible offset drift and transfer delays that may be associated with the $NO_x$ sensor signal response. Additionally, in certain implementations, the method for estimating the deterioration of a $NO_x$ sensor response rate discerns between a slow change rate of $NO_x$ signal, which can be indicative of a healthy and properly functioning $NO_x$ sensor, and a slow response rate due to sensor response rate deterioration, which can be indicative of an old or malfunctioning $NO_x$ sensor. Moreover, in some implementations, the method utilizes a zero-fueling condition of an associated internal combustion engine in determining the $NO_x$ sensor response rate deterioration estimate. Although the various embodiments described herein are associated with a $NO_x$ sensor of an exhaust after-treatment system, the essence of the invention can be applied to any sensor of any system as desired.

Figure 1:
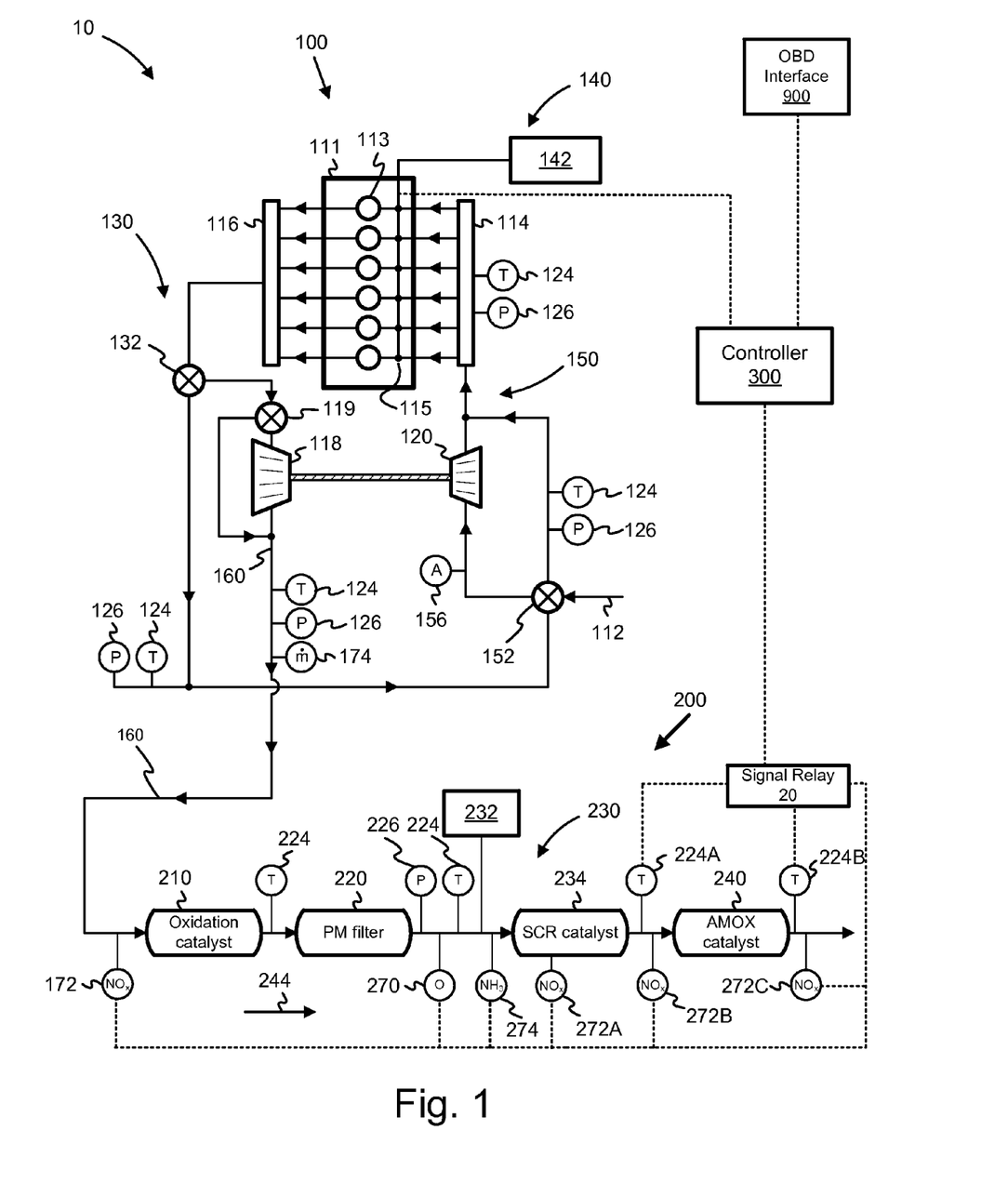
FIG. 1 is a schematic block diagram of an internal combustion engine system having an exhaust after-treatment system and a controller according to one representative embodiment.

FIG. 1 depicts one embodiment of an internal combustion engine system 10. The main components of the engine system 10 include an internal combustion engine 100, an exhaust gas after-treatment system 200 coupled to the exhaust output of the engine, and a controller 300.

The internal combustion engine 100 can be a compression ignited internal combustion engine, such as a diesel fueled engine, or a spark-ignited internal combustion engine, such as a gasoline fueled engine operated lean. The engine 100 includes an engine block 111, an air handling system 150 having an air inlet 112, intake manifold 114, EGR system 130, and a fuel delivery system 140 including fuel injectors 115 in fluid receiving communication with a fuel supply 142. The engine system 10 also includes an exhaust manifold 116, turbocharger turbine 118, turbocharger compressor 120, and various sensors. For example, in the illustrated embodiment, the engine 100 includes temperature sensors (e.g., temperature sensor 124), pressure sensors (e.g., pressure sensor 126), an air-flow sensor 156, $NO_x$ sensors (e.g., engine out $NO_x$ sensor 172), and mass flow sensors (e.g., exhaust mass flow sensor 174). The air inlet 112 is vented to the atmosphere and connected to an inlet of the intake manifold 114 to enable air to enter the intake manifold. The intake manifold 114 includes an outlet operatively coupled to the compression chambers 113 of the engine block 111 for introducing intake charge, e.g., air, and EGR gas into the compression chambers. The air handling system 150 may also include a compressor bypass valve 152 that is selectively actuatable to either allow intake air from the air inlet 112, and EGR gas if the valve 132 is opened, to pass through the compressor 120 or bypass the compressor. The fuel delivery system 140 introduces fuel into the cylinders to intermix with the intake charge and EGR prior to a combustion event in the cylinder.

Within the cylinders 113 of the engine block 111, the air from the atmosphere, and EGR gas if desired, is combined with fuel injected via the injectors 115 to power the engine. The injectors 115 are in electrical communication with the controller 300, which is operable to control the amount of fuel injected into the combustion chamber for combustion. Combustion of the fuel and air produces exhaust gas that is operatively vented to the exhaust manifold 116. From the exhaust manifold 116, a portion of the exhaust gas may be used to power the turbocharger turbine 118. The turbine 118 drives the turbocharger compressor 120, which may compress at least some of the air entering the air inlet 112 before directing it to the intake manifold 114 and into the compression chambers 113 of the engine block 111. The engine 100 also includes a turbine 118 bypass valve 119 selectively opened to allow exhaust gas to power the turbine 118 and selectively closed to bypass the exhaust around the turbine 118 and into an exhaust pipe 160 downstream of the turbine.

The exhaust gas after-treatment system 200 is coupled to the outlet pipe 160 of the exhaust manifold 116. At least a portion of the exhaust gas exiting the exhaust manifold 116 can pass through the exhaust after-treatment system 200. As mentioned above, the engine 100 includes the EGR system 130 having an EGR valve 132 configured to open to allow a portion of the exhaust gas to recirculate back into the compression chambers 113 for altering the combustion properties of the engine 100.

Generally, the exhaust gas after-treatment system 200 is configured to remove various chemical compound and particulate emissions present in the exhaust gas received from the exhaust manifold 116 and not recirculated back into the cylinders 113 of the engine block 111. The exhaust gas after-treatment system 200 includes an oxidation catalyst 210, a particulate matter (PM) filter 220, an SCR system 230 having a reductant delivery system 232 and an SCR catalyst 234, and an ammonia oxidation (AMOX) catalyst 240. In an exhaust flow direction, indicated by directional arrow 244, exhaust may flow from the exhaust manifold pipe 160, through the oxidation catalyst 210, through the particulate filter 220, through the SCR catalyst 234, through the AMOX catalyst 240, and then be expelled into the atmosphere via a tailpipe. In other words, the particulate filter 220 is positioned downstream of the oxidation catalyst 210, the SCR catalyst 234 is positioned downstream of the particulate filter 220, and the AMOX catalyst 240 is positioned downstream of the SCR catalyst 234. Generally, exhaust gas treated in the exhaust gas after-treatment system 200 and released into the atmosphere consequently contains significantly fewer pollutants, such as diesel particulate matter, $NO_x$, hydrocarbons, such as carbon monoxide and carbon dioxide, than untreated exhaust gas.

The oxidation catalyst 210 can be any of various flow-through, diesel oxidation catalysts (DOC) known in the art. Generally, the oxidation catalyst 210 is configured to oxidize at least some particulate matter, e.g., the soluble organic fraction of soot, in the exhaust and reduce unburned hydrocarbons and CO in the exhaust to less environmentally harmful compounds. For example, the oxidation catalyst 210 may sufficiently reduce the hydrocarbon and CO concentrations in the exhaust to meet the requisite emissions standards.

The particulate filter 220 can be any of various particulate filters known in the art configured to reduce particulate matter concentrations, e.g., soot and ash, in the exhaust gas to meet requisite emission standards. The particulate filter 220 can be electrically coupled to a controller, such as controller 300, that controls various characteristics of the particulate filter, such as, for example, the timing and duration of filter regeneration events. In some implementations, the particulate filter 220 and associated control system is similar to, or the same as, the respective particulate filters and control systems described in U.S. patent application Ser. Nos. 11/227,320; 11/227,403; 11/227,857; and 11/301,998 (hereinafter "incorporated particulate filter applications"), which are incorporated herein by reference.

The SCR system 230 can be similar to the SCR system described in U.S. patent application Ser. No. 12/112,500, filed Apr. 30, 2008, U.S. patent application Ser. No. 12/112,622, filed Apr. 30, 2008, U.S. patent application Ser. No. 12/112,678, filed Apr. 30, 2008, and U.S. patent application Ser. No. 12/112,795, filed Apr. 30, 2008 (hereinafter "incorporated SCR patent applications"), which are each incorporated herein by reference.

For example, the SCR system 230 includes a reductant delivery system 232 that includes a reductant source, pump and delivery mechanism or injector, which are not shown. The reductant source can be a container or tank capable of retaining a reductant, such as, for example, ammonia ($NH_3$), urea, diesel fuel, or diesel oil. The reductant source is in reductant supplying communication with the pump, which is configured to pump reductant from the reductant source to the delivery mechanism. The delivery mechanism can include a reductant injector positioned upstream of the SCR catalyst 234. The injector is selectively controllable to inject reductant directly into the exhaust gas stream prior to entering the SCR catalyst 234. In some embodiments, the reductant can either be ammonia or urea, which decomposes to produce ammonia. The ammonia reacts with $NO_x$ in the presence of the SCR catalyst 234 to reduce the $NO_x$ to less harmful emissions, such as $N_2$ and $H_2O$. The SCR catalyst 234 can be any of various catalysts known in the art. For example, in some implementations, the SCR catalyst 234 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 234 is a zeolite-based catalyst.

The AMOX catalyst 240 can be any of various flow-through catalysts configured to react with ammonia to produce mainly nitrogen. Generally, the AMOX catalyst 240 is utilized to remove ammonia that has slipped through or exited the SCR catalyst 234 without reacting with $NO_x$ in the exhaust. In certain instances, the after-treatment system 200 can be operable with or without an AMOX catalyst. Further, although the AMOX catalyst 240 is shown as a separate unit from the SCR catalyst 234, in some implementations, the AMOX catalyst can be integrated with the SCR catalyst, e.g., the AMOX catalyst and the SCR catalyst can be located within the same housing.

As shown in FIG. 1, the exhaust after-treatment system 200 includes various sensors, such as temperature sensors (e.g., temperature sensors 224, 224A, 224B), pressure sensor (e.g. pressure sensor 226), oxygen sensors (e.g., oxygen sensor 270), $NO_x$ sensors (e.g., SCR catalyst $NO_x$ sensor 272A, SCR catalyst outlet $NO_x$ sensor 272B, and tailpipe NOx sensor 272C), $NH_3$ sensors (e.g., $NH_3$ sensor 274), dual ammonia/

$NO_x$ sensors (not shown) and the like, that are disposed throughout the exhaust gas after-treatment system.

The various sensors of the engine 100 and exhaust after-treatment system 200 may be in electrical communication with the controller 300. The controller 300 is operable to monitor operating conditions and control the engine 100 and exhaust after-treatment system 200. In certain implementations, the engine system 10 includes a signal relay 20 in signal receiving communication with one or more of the sensors of the system 10. Although the signal relay 20 in FIG. 1 is shown in electrical communication with the engine outlet $NO_x$ sensor 172, PM filter outlet oxygen sensor 270, SCR catalyst inlet ammonia sensor 274, SCR catalyst $NO_x$ sensor 272A, AMOX catalyst inlet and outlet exhaust temperature sensors 124A, 124B, AMOX catalyst inlet NOx sensor 272B, and tailpipe $NO_x$ sensor 272C, the signal relay 20 can be in electrical communication with fewer or more illustrated or non-illustrated sensors of the engine system 10. The signal relay 20 may transmit the received signals to the controller for computation and analysis. In certain implementations, the engine system 10 does not include a signal relay 20, and each of the various sensors of the engine system is in electrical communication directly with the controller 300.

The sensors of the engine system 10 are configured to detect a property value and generate a response signal representative of the detected property value. The sensors of the engine system 10, for example, can be configured to detect respective property values associated with exhaust gas flowing from the engine 100 through the exhaust after-treatment system 200. The sensors can be designed to detect or sample a respective property value periodically, e.g., once every 200 milliseconds. For each detection period, a sensor transmits a response representative of the detected property value to the controller 300 via a signal relay 20 if desired. The controller interprets the response received from the sensor using predetermined look-up tables or algorithms to determine a numerical amount of the detected property. For healthy sensors, the response rate of the sensors following detection of a property value is relatively quick, e.g., above a certain threshold. However, for aged or defective sensors, the response rate of the sensors may be relatively slow, e.g., below a threshold. In the context of an engine system, if the response rate is slow, the accuracy of the sensor is compromised and the system performance and emissions compliance may be hampered as a result. Accordingly, regulations are in place requiring on-board diagnostic controls that notify a user of a sensor having a response rate deterioration level above a certain threshold.

In one embodiment, the controller 300 is configured to estimate the deterioration level of the response rate of the various sensors. The controller 300 then notifies an on-board diagnostics system to alert a user if an estimated deterioration level is above a threshold by communicating with the on-board diagnostic interface 900. The controller 300 in FIG. 1 is depicted as a single physical unit, but can include two or more physically separated units or components in some embodiments if desired. Generally, the controller 300 receives multiple inputs, processes the inputs, and transmits multiple outputs. The multiple inputs may include sensed measurements from the sensors, virtual sensor inputs, and various user inputs. The inputs are processed by the controller 300 using various algorithms, stored data, and other inputs to update the stored data and/or generate output values. The generated output values and/or commands are transmitted to other components of the controller and/or to one or more elements of the engine system 10 to control the system to achieve desired results, and more specifically, to achieve desired exhaust gas emissions at the tailpipe. For simplicity, the description of the response rate deterioration estimation features of the controller 300 will proceed with reference to the tailpipe $NO_x$ sensor 272C. However, it is recognized that the following principles associated with response rate deterioration is applicable to other sensors configured to detect other property values without departing from the essence of the invention.

Figure 2:
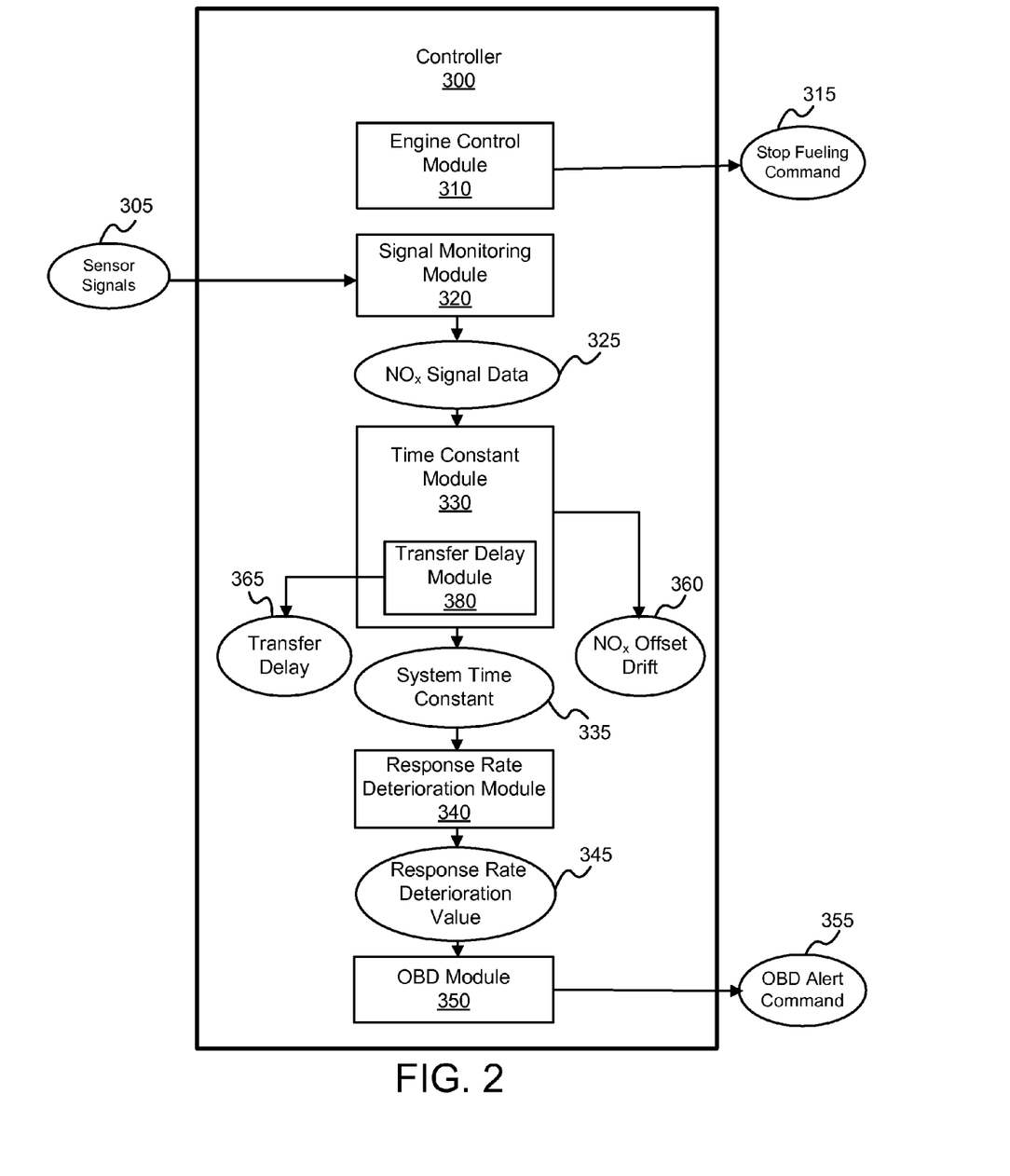
FIG. 2 is a schematic block diagram of a controller of an internal combustion engine system according to one representative embodiment.

Referring to FIG. 2, the controller 300 includes an engine control module 310 configured to operate the engine 100 in a vehicle motoring condition by generating a stop fueling command 315. The stop fueling command 315 is transmitted directly to the fuel injectors 115 or a fuel injection control module (not shown). In response to the stop fueling command 315, the fuel injectors 115 stop the supply of fuel to the combustion chambers. Referring to graph 400 of FIG. 3, in one example, the fuel supply to the engine 100, which is represented by line 410, is stopped at time $T_{start}$. Because no fuel is being supplied to the combustion chambers, combustion is not taking place and combustion byproducts in the exhaust exiting the engine 100 are reduced to a constant value at approximately the same time that fueling stops or the vehicle motoring condition starts, i.e., at time $T_{start}$. In the case of $NO_x$ concentration in the exhaust during vehicle motoring condition, the value is reduced to approximately zero. The actual amount of $NO_x$ in the exhaust exiting the engine is represented by line 420.

Figure 3:
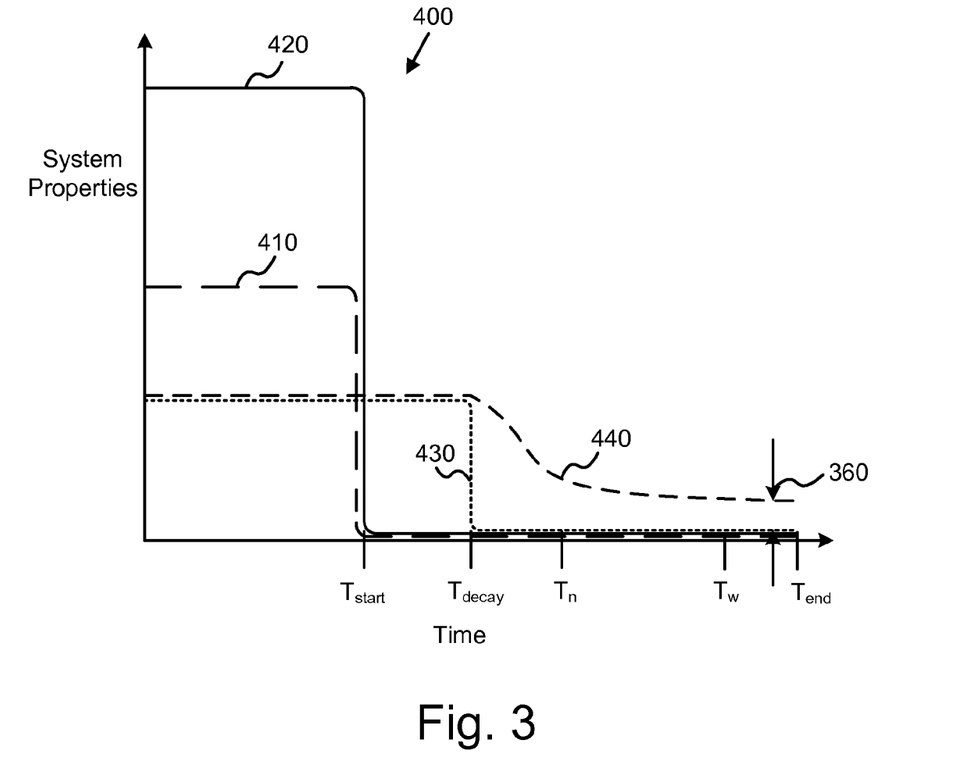
FIG. 3 is a graph of actual and sensed values for $NO_x$ and fueling as a function of time according to one representative embodiment.

Eventually, the actual amount of $NO_x$ exiting the tailpipe, which is represented by line 430 of graph 400, will drop to approximately zero or below a threshold at time $T_{decay}$. The difference between the time $T_{start}$ and the time $T_{decay}$ is defined as a transfer delay. More specifically, the transfer delay represents the amount of time for the last amount of $NO_x$ generated by the engine 100 before the vehicle motoring condition is initiated to pass through post-engine systems, pass through the exhaust after-treatment system, and pass by the tailpipe $NO_x$ sensor 272C. The transfer delay of an engine system 10 is dependent upon many factors and is typically different for different vehicle platforms. Typical factors include the size of after-treatment system components, the length of the after-treatment system, the number of after-treatment system components, etc. Based on the engine system configuration, in some embodiments, the transfer delay can vary from about tens of milliseconds to about six seconds.

The engine control module 310 can be configured to operate the engine 100 in a vehicle motoring condition according to a tailpipe $NO_x$ sensor testing schedule. The tailpipe $NO_x$ sensor testing schedule can include a plurality of testing periods occurring at a predetermined rate, for example, once every day, week, month, or other desirable periodic rate. Alternatively, the testing periods of the $NO_x$ sensor testing schedule can be adjustable over time based on any of various engine operating conditions, user input, and external factors. The testing periods each represent a period of time in which the controller 300 receives and stores sensor signal data. Following a testing period, the controller 300 estimates a current deterioration value of the tailpipe $NO_x$ sensor 272C and forwards an OBD alert command 355 to the OBD interface 900 if necessary. The testing period is represented in graph 400 as the time between time $T_{start}$ and time $T_{end}$.

While the engine 100 is operating in the vehicle motoring condition, a signal monitoring module 320 of the controller 300 monitors sensor signals 305 received from the tailpipe $NO_x$ sensor 272C. A representative monitored sensor signal 305 from a tailpipe $NO_x$ sensor 272C is represented by line 440 of graph 400 (see FIG. 3). As will be described in more detail below, the signal monitoring module 320 stores in a memory a plurality of $NO_x$ sensor data points. Each data point includes a $NO_x$ value indicated by a sensor signal 305 and an associated time value, which can be representative of the time at which the signal was received by the signal monitoring module. The signal monitoring module 320 continuously collects and stores data points while the engine is operating in the vehicle motoring condition, e.g., during the $NO_x$ sensor testing periods or between time $T_{start}$ and time $T_{end}$ (see FIG. 3).

Referring to FIG. 3, the detected amount of $NO_x$ 440 in the exhaust gas stream at the tailpipe does not drop to zero or near zero at time $T_{decay}$ along with the actual amount of $NO_x$ 430 in the exhaust gas stream. Rather, at time $T_{decay}$, the detected amount of $NO_x$ 440 begins to decay by following an exponential-like function even when the tailpipe $NO_x$ sensor signal is a step function. Accordingly, the decay rate of the detected amount of $NO_x$ 440 can be quantified by modeling the exponential-like function with an exponential function and defining the decay rate of the exponential-like function as the decay rate of the exponential function. For convenience in formulating the parameter estimation problem as will be described below, the exponential function can be represented as the solution of a first order non-homogeneous linear differential equation.

Figure 4:
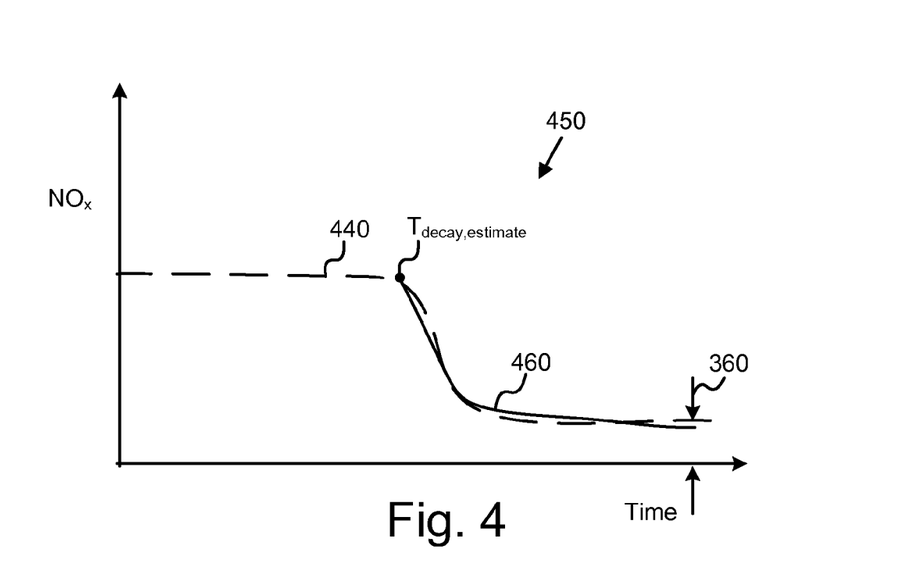
FIG. 4 is a graph of sensed $NO_x$ values for a signal response and an estimated curve fit of the sensed $NO_x$ values according to one representative embodiment.

Because the vehicle is being operated in a vehicle motoring condition, at time $T_{decay}$, the slow change of the tailpipe $NO_x$ signal 440 after time $T_{decay}$ (compared to the fast change of the actual $NO_x$ concentration 430) is related only to the inherent sensor dynamics. Accordingly, the response rate of the sensor decreases (i.e., the response time increases) with the deterioration of the sensor. The time constant module 330 of the controller 300 is configured to estimate a time constant of the detected amount of $NO_x$ using a curve fit method. The signal decay curve fit 460 of the detected amount of $NO_x$ 440 is represented in graph 450 of FIG. 4. The curve fit 460 of FIG. 4 can be represented by the following equation:

$$NOx = A \cdot e^{\left(-\frac{(t-t_0)}{\tau}\right)} + NOx_0 \qquad (1)$$

where A is the initial amplitude of the signal prior to decay without sensor drift, $\tau$ is a time constant representing the rate of decay or deterioration of the signal, and $NOx_0$ is the $NO_x$ offset drift 360 (see FIGS. 3 and 4).

As defined herein, $NO_x$ offset drift is the difference between a sensed output signal of a property at equilibrium or steady state and the actual property value at equilibrium or steady state. Generally, the $NO_x$ offset drift $NOx_0$ represents noise present in the system or modeling uncertainty. Typically, $NO_x$ offset drift $NOx_0$ has some value different from zero because in practice the $NO_x$ value does not decay exponentially and at least some noise is present. The time constant $\tau$ represents the time constant for a continuous mathematical function similar to Equation 1. In other terms, the time constant $\tau$ represents how quickly the $NO_x$ signal approaches equilibrium and is equal to the inverse of the exponential decay rate with negative sign. The time constant $\tau$ can be used to assess the $NO_x$ sensor response rate deterioration. To determine the time constant $\tau$ for the continuous function, the time constant module 330 is configured to first determine a constant k of a discrete-time approximation of the continuous mathematical function (e.g., Equation 1) as will be described below.

According to one representative embodiment, the time constant module 330 estimates the parameters that define the exponential decay curve 460 by fitting the decay curve to the signal curve 440. Equation 1 can be written as the solution of a first order non-homogeneous linear differential equation. However, because of the discrete nature of today's computers, a more convenient form for parameter estimation is to approximate the first order non-homogeneous linear differential equation with a non-homogeneous linear difference equation. Any of the available approximation methods can be used in this embodiment. One of the approximations leads to the following linear difference equation:

$$F = y_i = k^*(u - y_{i-1}) + y_{i-1} = k_2 - ky_{i-1} + y_{i-1} \qquad (2)$$

where $y_i$ is the $NO_x$ concentration at the ith sampling time, k is a known function of the time constant $\tau$ and the sampling period, u is the $NO_x$ offset drift $NOx_0$, and $k_2$ is k times u.

For a given set of data $\{(t_1,y_1), (t_2,y_2), \ldots (t_n,y_n)\}$, the least squares curve fit 460 is defined by the values of k and $k_2$ that provide the smallest value of $\Pi$ in Equation 3 as follows:

$$\Pi = \sum_{i=1}^{n} [y_i - F]^2 = \sum_{i=1}^{n} [y_i - k_2 + ky_{i-1} - y_{i-1}]^2 = \min \qquad (3)$$

The values of k and $k_2$ that minimize $\Pi$ in Equation 3 can be obtained by taking the partial derivatives of the summation $\Pi$ with respect to k and $k_2$ and setting them to zero as follows:

$$\frac{\partial \Pi}{\partial k} = 2 \sum_{i=1}^{n} y_{i-1}[(y_i - y_{i-1}) - k_2 + ky_{i-1}] = 0 \qquad (4)$$

$$\frac{\partial \Pi}{\partial k_2} = -2 \sum_{i=1}^{n} [(y_i - y_{i-1}) - k_2 + ky_{i-1}] = 0 \qquad (5)$$

Equation 4 can be rearranged to read:

$$\sum_{i=1}^{n} y_{i-1}(y_i - y_{i-1}) = k_2 \sum_{i=1}^{n} y_{i-1} - k \sum_{i=1}^{n} (y_{i-1})^2 \qquad (6)$$

and Equation 5 can be rearranged to read:

$$\sum_{i=1}^{n} (y_i - y_{i-1}) = k_2 \sum_{i=1}^{n} 1 - k \sum_{i=1}^{n} y_{i-1} \qquad (7)$$

To simplify Equations 6 and 7, the following substitutions can be made:

$$a_1 = \sum_{i=1}^{n} y_{i-1} \qquad (8)$$

$$b_1 = \sum_{i=1}^{n} -(y_{i-1})^2 \qquad (9)$$

$$c_1 = \sum_{i=1}^{n} y_{i-1}(y_i - y_{i-1}) \qquad (10)$$

$$a_2 = \sum_{i=1}^{n} 1 = n \qquad (11)$$

$$b_2 = \sum_{i=1}^{n} -y_{i-1} \qquad (12)$$

$$c_2 = \sum_{i=1}^{n}(y_i - y_{i-1}) \quad (13)$$

which yields:

$$c_1 = k_2 a_1 + k b_1 \quad (14)$$

$$c_2 = k_2 a_2 + k b_2 \quad (15)$$

Solving Equations 14 and 15 for k and $k_2$, and utilizing a relationship between u, k, and $k_2$, the following solutions are determined:

$$k = \frac{a_2 c_1 - a_1 c_2}{a_2 b_1 - a_1 b_2} \quad (16)$$

$$k_2 = \frac{b_1 c_2 - b_2 c_1}{a_2 b_1 - a_1 b_2} \quad (17)$$

$$u = \frac{k_2}{k} \quad (18)$$

As discussed above, an estimate of the time constant τ can be determined from k via a direct relationship as follows:

$$k = 1 - e^{-dT/\tau} \quad (19)$$

Instead of, or in addition to, using Equation 19, other approaches and/or approximations can be used to determine the time constant τ from k. In Equation 18, the parameter u is equal to the $NO_x$ offset drift $NOx_0$ of Equation 1. Accordingly, based on a least squares fit method as discussed above, the time constant module 330 is configured to determine the time constant 335 (i.e., time constant τ) of the tailpipe $NO_x$ sensor signal during a vehicle motoring condition, as well as determine the $NO_x$ offset drift $NOx_0$ of the tailpipe $NO_x$ sensor signal, i.e. $NO_x$ offset drift 360 (see FIG. 2).

For embodiments using a fitting method other than least squares (i.e., fitting methods that use a definition of Π that is different than Equation 3), the expressions to estimate k and $k_2$ may be different than those shown in Equations 16 and 17, respectively. For a fitting method other than least squares, the expressions to estimate k and $k_2$ can be obtained by following a derivation process similar to the one represented by Equations 4-19 above but using a different definition of Π associated with the fitting method.

Based on the estimated time constant τ, the response rate deterioration module 340 is configured to determine a response rate deterioration value 345 or factor. The response rate deterioration value 345 can be any of various values representing a level of deterioration of the tailpipe $NO_x$ sensor response rate. For example, the response rate deterioration value 345 can be a one-to-one equivalent of the estimated time constant τ or other equivalent value, such as a scaled percentage or ratio.

The determined response rate deterioration value 345 is then compared to a predetermined threshold value by the OBD module 350. Based on the comparison between the response rate deterioration value 345 and the threshold value, the OBD module 350 may issue an alert command 355. For example, where the threshold value represents a maximum deterioration of the tailpipe $NO_x$ sensor response rate allowed by emissions regulations, the OBD module 350 will issue an alert command 355 if the response rate deterioration value 345 exceeds the threshold value. In response to receiving an alert command 355, the OBD interface 900 commands an OBD indicator to alert a user that the response rate deterioration value is above a threshold. In some instances, the alert will indicate to a user that the sensor has passed or failed, e.g., needs to be replaced or is malfunctioning.

The time constant module 330 is also configured to determine the transfer delay 365, which is equal to the time period between time $T_{start}$ and time $T_{decay}$ as discussed above. Generally, the transfer delay 365 is determined by estimating the time $T_{decay}$ when the signal decay or first order response begins. Additionally, an accurate estimation of the time when the signal decay begins, i.e. $T_{decay}$, may be important in estimating an accurate time constant.

Figure 5:
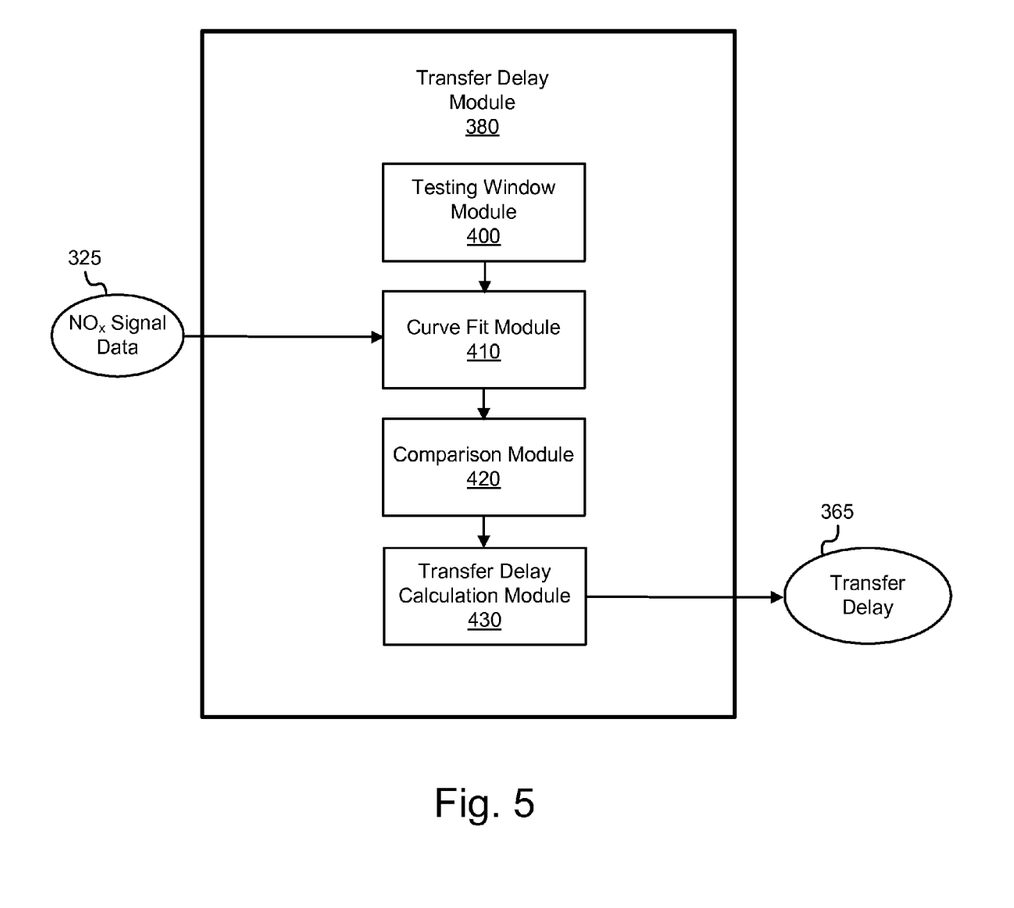
FIG. 5 is a schematic block diagram of a time constant module according to one representative embodiment.

Referring to FIG. 5, the time constant module 330 includes a transfer delay module 380, which includes a testing window module 400, curve fit module 410, comparison module 420, and transfer delay calculation module 430. The transfer delay module 380 utilizes a method 600 for determining the transfer delay 365 (see FIG. 6). Generally, the method 600 includes analyzing data occurring well after the first order response begins (e.g., right of time $T_{decay}$ in the graph 400) and incrementally backtracking to analyze earlier data. The earlier data is compared to the later data until the point at which the response begins to decay (e.g., time $T_{decay}$) is found. At 610 of the method 600, the testing window module 400 selects a testing time window within which data points may be used for determining the beginning of an estimated first order response. In certain implementations, the testing time window extends from time $T_{start}$ to a variable time $T_w$. The time $T_w$ depends on one or more factors as desired. For example, in systems having sensors with relatively longer response times or relatively longer exhaust after-treatment systems, the time $T_w$ is well after the time $T_{start}$, e.g., 20 seconds after time $T_{start}$. However, in systems having sensors with relatively shorter response times or relatively shorter exhaust after-treatment systems, the time $T_w$ may be relatively closer to time $T_{start}$, e.g., 5 seconds after $T_{start}$. Additionally, the flow rate of exhaust through the after-treatment system and the diameter of the exhaust pipe may affect the selection of time $T_w$.

Figure 6:
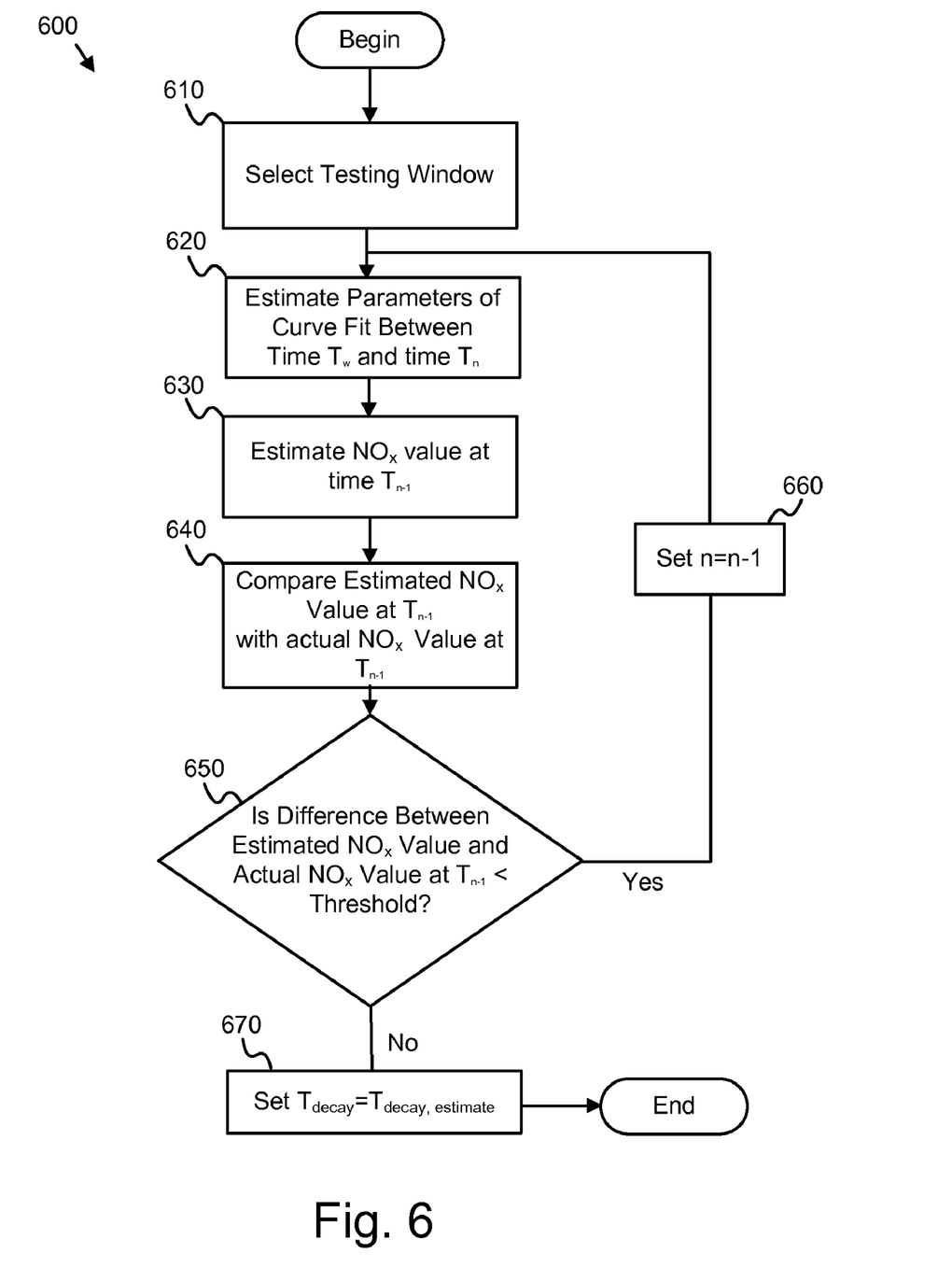
FIG. 6 is a flow chart of a method for determining a start time of a sensor signal decay response according to one representative embodiment.

After the testing time window is selected by the testing window module 400, the curve fit module 410 uses a select number of data points within the testing time window between time $T_w$ and a variable time $T_n$ (see FIG. 3) within the testing time window to determine a preliminary or first time constant similar to time constant 335 and a preliminary or first $NO_x$ offset drift similar to $NO_x$ offset drift 360. The curve fit module 410 then uses the preliminary time constant and $NO_x$ offset drift to estimate at 620 of the method 600 the parameters of a preliminary or first curve of the decaying signal response 440 using the equations and techniques discussed above. In certain implementations, the selected data points are fewer than all the data points stored by the signal monitoring module 320 between time $T_w$ and time $T_n$. For example, the signal monitoring module 320 stores data points at a high rate, e.g, every 200 milliseconds. However, the data points selected by the curve fit module 410 may be a lower number of data points occurring only every 1,000 milliseconds or more. The selected data points are used to determine a preliminary or first time constant and a preliminary or first $NO_x$ offset drift, which are used to estimate a preliminary or first curve fit between time $T_w$ and time $T_n$.

The curve fit module 410 uses the parameters of the preliminary or first curve estimation between time $T_w$ and time $T_n$ to estimate the $NO_x$ value at the time $T_{n-1}$ at 630 of the method 600. At 640 of the method, the comparison module 420 compares the estimated $NO_x$ value at time $T_{n-1}$ to the actual $NO_x$ value at time $T_{n-1}$. If the difference between the estimated $NO_x$ value at time $T_{n-1}$ and the actual $NO_x$ value at time $T_{n-1}$ is below a threshold value at 650 of the method 600, then n is set to n−1 at 660 such that time $T_n$ becomes time $T_{n-1}$ and time $T_{n-1}$ becomes $T_{n-2}$. The curve fit module 410 then estimates new parameters of a new curve using one or more additional data points occurring earlier in time than the earliest data point used in the first or previous curve fit estimation, e.g., between time $T_w$ and time $T_{n-1}$, and the comparison module 420 performs another $NO_x$ value comparison as discussed above. For example, the curve fit module 410 uses the new parameters of the new curve between time $T_w$ and time $T_{n-1}$ at 630 to estimate the $NO_x$ value at the time $T_{n-2}$. Then, at 640, the comparison module 420 compares the estimated $NO_x$ value at $T_{n-2}$ to the actual $NO_x$ value at $T_{n-2}$ and the method proceeds to 650.

The process of adding earlier data points, estimating additional parameters for additional curves, and comparing estimated $NO_x$ values to actual $NO_x$ values continues until the difference between the earliest estimated $NO_x$ value using the estimated parameters of the latest curve estimation and the corresponding actual $NO_x$ value is above a threshold at 650. Then, the method 600 proceeds to set at 670 the time associated with the beginning of the exponential-like decay of the detected amount of $NO_x$ 440 (i.e., time $T_{decay}$) to an estimated time $T_{decay,estimate}$ representing the beginning of as the signal decay curve fit 460 shown in FIG. 4. The estimated time $T_{decay,estimate}$ corresponds with the time associated with the earliest estimated $NO_x$ value (as determined at 630). The transfer delay module 430 then receives the set time $T_{decay}$ and estimates the transfer delay 365 of the system by taking the difference of the time $T_{decay}$ and the $T_{start}$.

Once the time $T_{decay}$ is estimated, the time constant module 330 utilizes the time $T_{decay}$ estimated by the transfer delay module 380 as the beginning of the estimated response signal curve and all the data points between the time $T_{decay}$ and $T_{end}$ in the equations discussed above to estimate a final time constant 335, final $NO_x$ offset drift 360, and final parameters of the curve fit 460 of the system response. The final estimations are then used by the response rate deterioration module 340 to determine a final response rate deterioration value 345 using the techniques discussed above. The OBD module 350 then issues an alert command 355 as necessary in response to the final response rate deterioration value 345.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for determining a deterioration of a $NO_x$ sensor response rate in an internal combustion engine system, comprising:

an engine control module configured to stop fueling to an internal combustion engine during motoring of the internal combustion engine;

a signal monitoring module configured to monitor a $NO_x$ sensor signal after the engine control module stops fueling to the internal combustion engine during motoring of the internal combustion engine and store $NO_x$ sensor signal data corresponding to the monitored $NO_x$ sensor signal;

a time constant module configured to estimate a time constant of the $NO_x$ sensor signal response after the engine control module stops fueling; and a response rate deterioration module configured to determine a response rate deterioration value of the $NO_x$ sensor based at least partially on the estimated time constant.

2. The apparatus of claim 1, wherein the time constant of the $NO_x$ sensor signal is determined using a function fitting method.

3. The apparatus of claim 2, wherein the function fitting method comprises a least squares fit method.

4. The apparatus of claim 3, wherein a curve fit of the least squares fit method is defined by the values k and $k_2$ that provide the smallest value of $\Pi$ according to the equation $$\Pi = \sum_{i=1}^{n} [y_i - k_2 + ky_{i-1} - y_{i-1}]^2 = \min,$$

wherein $y_i$ comprises the $NO_x$ concentration in exhaust gas generated by the internal combustion engine at an ith sampling time, k comprises a function of the time constant of the $NO_x$ sensor signal and the sampling period, and $k_2$ comprises a function of k and an offset drift of the $NO_x$ sensor signal.

5. The apparatus of claim 1, wherein the response rate deterioration module is configured to determine an offset drift of the $NO_x$ sensor signal, the time constant being based at least partially on the offset drift.

6. The apparatus of claim 1, wherein the response rate deterioration module is configured to determine a transfer delay of the $NO_x$ sensor signal.

7. The apparatus of claim 6, wherein the transfer delay of the $NO_x$ sensor signal is based at least partially on an estimated starting time of a decay of the $NO_x$ sensor signal response.

8. The apparatus of claim 7, wherein the estimated starting time of the decay of the $NO_x$ sensor signal response is based on a comparison between an estimated $NO_x$ value at a time after the engine control module stops fueling and a sensed $NO_x$ value at the same time.

9. The apparatus of claim 8, wherein the estimated starting time of the decay of the $NO_x$ sensor signal is equal to the time at which a difference between the estimated $NO_x$ value and the sensed $NO_x$ value is above a threshold.

10. The apparatus of claim 8, wherein the estimated $NO_x$ value is estimated using a curve fit of the stored $NO_x$ sensor signal data during a testing time window after the engine control module stops fueling to the internal combustion engine during motoring of the internal combustion engine, wherein the estimated $NO_x$ value is estimated at a time prior to a start of the testing time window.

11. The apparatus of claim 1, wherein the time constant of the $NO_x$ sensor signal response is based on a discrete-time approximation of a continuous mathematical function.

12. A system for determining a sensor condition, comprising:
a sensor configured to detect a property value and generate a response signal representative of the detected property value; and
a controller communicable in response signal receiving communication with the sensor, the controller configured to monitor a response signal received from the sensor, determine a time constant of the response signal based on a function fitting method, and estimate a deterioration factor of the response signal received from the sensor based at least partially on the determined time constant.

13. The system of claim 12, further comprising an internal combustion engine capable of generating an exhaust gas stream, and wherein the sensor is configured to detect a property value of the exhaust gas stream.

14. The system of claim 13, wherein the internal combustion engine is in fueling receiving communication with a fuel source, and wherein the time constant comprises a time constant of the response signal during a prescheduled testing period, the prescheduled testing period comprising a time period during which fueling of the internal combustion engine is stopped while motoring of the internal combustion engine is maintained.

15. The system of claim 12, further comprising an on-board diagnostics indicator communicable in signal receiving communication with the controller, wherein the controller signals the on-board diagnostics indicator to indicate a condition of the sensor in response to an estimated deterioration factor being above a threshold.

16. The system of claim 12, further comprising an internal combustion engine, wherein the sensor comprises a $NO_x$ sensor configured to detect an amount of $NO_x$ in an exhaust gas stream generated by the engine, and wherein the controller is configured to stop fueling of the engine and monitor a decay rate of the response signal while fueling of the engine is stopped.

17. A method for determining a deterioration of a $NO_x$ sensor response rate, comprising:
stopping fuel consumption in an internal combustion engine during motoring of the engine;
monitoring a $NO_x$ sensor signal after fuel consumption has been stopped;
estimating a decay rate of the $NO_x$ sensor signal using a function fitting method; and
estimating a deterioration value of a response rate of the $NO_x$ sensor signal based at least partially on the estimated decay rate.

18. The method of claim 17, further comprising estimating a transfer delay of the $NO_x$ sensor signal by estimating a starting time of a decay of the $NO_x$ sensor signal after fuel consumption has been stopped based on stored $NO_x$ sensor signal data collected during a predetermined time period following fuel consumption stoppage.

19. The method of claim 18, wherein the decay rate of the $NO_x$ sensor signal is estimated based on the estimated starting time of the decay of the $NO_x$ sensor signal.

20. The method of claim 18, wherein a length of the predetermined time period is based on at least one of a length of an exhaust after-treatment system to which the $NO_x$ sensor signal is coupled, a flow rate of exhaust gas through the exhaust after-treatment system, a diameter of an exhaust pipe of the exhaust after-treatment system, and a response time of the $NO_x$ sensor in a non-deteriorated condition.

21. The method of claim 18, wherein estimating the starting time of the $NO_x$ sensor signal decay comprises using a first set of data of the stored $NO_x$ sensor signal data associated with a first time window to curve fit a first exponential function, using the curve fit of the first exponential function to estimate a $NO_x$ value at a first time before the first time window, comparing the estimated $NO_x$ value at the first time with an actual $NO_x$ value at the first time, and setting the first time as the starting time of the $NO_x$ sensor signal decay if the difference between the estimated $NO_x$ value and the actual $NO_x$ value is above a threshold.

22. The method of claim 21, wherein if the difference between the estimated $NO_x$ value and the actual $NO_x$ value is below a threshold, the method includes using a second set of data of the stored $NO_x$ sensor signal data associated with a second time window starting before the first time window to curve fit a second exponential function, the method further comprising using the curve fit of the second exponential function to estimate a $NO_x$ value at a second time before the second time window and the first time, comparing the estimated $NO_x$ value at the second time with an actual $NO_x$ value at the second time, and setting the second time as the starting time of the $NO_x$ sensor signal decay if the difference between the estimated $NO_x$ value at the second time and the actual $NO_x$ value at the second time is above the threshold.

23. The method of claim 18, wherein estimating the starting time of the decay of the $NO_x$ sensor signal comprises analyzing stored $NO_x$ sensor signal data after a predicted starting time of the $NO_x$ sensor signal decay and incrementally backtracking to analyze earlier stored $NO_x$ sensor signal data.

* * * * *